US006886862B2

(12) United States Patent
Matthew

(10) Patent No.: US 6,886,862 B2
(45) Date of Patent: May 3, 2005

(54) ATTACHMENT MEANS AND ATTACHMENT ASSEMBLY

(76) Inventor: George Alexander Matthew, 2 Station Road, Muthill, By Crieff PH5 2AR (GB)

( * ) Notice: Subject to any disclaimer, the term of this patent is extended or adjusted under 35 U.S.C. 154(b) by 47 days.

(21) Appl. No.: 10/204,138

(22) PCT Filed: Feb. 19, 2001

(86) PCT No.: PCT/GB01/00696

§ 371 (c)(1),
(2), (4) Date: Nov. 20, 2002

(87) PCT Pub. No.: WO01/61199

PCT Pub. Date: Aug. 23, 2001

(65) Prior Publication Data

US 2003/0141714 A1 Jul. 31, 2003

(30) Foreign Application Priority Data

Feb. 17, 2000 (GB) ............................................ 0003715

(51) Int. Cl.[7] ................................................ B62D 25/18

(52) U.S. Cl. ....................... 280/848; 280/847; 280/160; 280/849; 403/326

(58) Field of Search ................................ 280/847, 848, 280/153.5, 154, 849, 851, 159, 160, 855, 280; 403/325, 326, 327, 328

(56) References Cited

U.S. PATENT DOCUMENTS

| | | | | | |
|---|---|---|---|---|---|
| 817,203 | A | * | 4/1906 | Thompson | 280/154 |
| 1,899,937 | A | * | 3/1933 | Brown | 280/847 |
| 3,240,519 | A | | 3/1966 | Weasler | |
| 3,934,901 | A | * | 1/1976 | Hammerly | 280/851 |
| 4,148,373 | A | * | 4/1979 | Cline | 280/851 |
| 4,165,092 | A | * | 8/1979 | Herlein | 280/851 |
| 4,205,861 | A | * | 6/1980 | Roberts et al. | 280/851 |
| 4,421,333 | A | * | 12/1983 | Van Dyke | 280/851 |
| 4,453,728 | A | * | 6/1984 | Verge | 280/851 |

(Continued)

FOREIGN PATENT DOCUMENTS

| | | | | | |
|---|---|---|---|---|---|
| DE | 43 24 803 | A | | 3/1994 | |
| FR | 2 279 604 | A | | 2/1976 | |
| GB | 1526212 | A | * | 9/1978 | B62D/25/16 |
| GB | 2 035 932 | A | | 6/1980 | |
| GB | 2035932 | A | * | 6/1980 | B62D/25/18 |
| GB | 2 334 937 | A | | 9/1999 | |

*Primary Examiner*—Christopher P. Ellis
*Assistant Examiner*—Kelly E. Campbell
(74) *Attorney, Agent, or Firm*—Drinker Biddle & Reath LLP

(57) ABSTRACT

An attachment means (4) in the form of a hollow cylindrical socket (10) integral with a tangentially intersecting housing (30) in which a latch pin (8) is longitudinally slidable. The latch pin (8) has a cylindrical head **(8*a*) of relatively large diameter but relatively short length, and a cylindrical shaft (8*b*) that is relatively long but of relatively small diameter. The axis of the latch housing is offset outwardly of an imaginary line tangentially intersecting the bore of the socket by more than half the diameter of the latch pin shaft (8*b*) but less than half the diameter of the latch pin head (8*b*). The latch pin (8) is biased by a spring (7) such that the latch pin head (8*a*) normally lies partly within the bore of the socket (10) to engage a notch (12) near the end of a rod (5) or other plug-like member attached to the socket (10) and thereby positively retain this rod (5). Manually depressing the latch pin (8) against the force of the spring (7) pushes the latch pin head (8*a*) out of the bore of the socket (10) which instantly releases the rod (5) since the latch pin shaft (8*b*) always lies completely outside the bore of the socket (10). The attachment assembly (4+5) allows easy assembly of two members, and their quick release when required. The attachment means is applicable to attachment of parts and accessories to vehicles, e.g. mudguards (14) and side-skirts (50, 51)**.

36 Claims, 11 Drawing Sheets

U.S. PATENT DOCUMENTS

| | | | | | |
|---|---|---|---|---|---|
| 4,591,178 | A | * | 5/1986 | Mortvedt et al. | 280/154 |
| 4,627,594 | A | * | 12/1986 | Reed | 248/632 |
| 4,735,428 | A | * | 4/1988 | Antekeier | 280/154 |
| 4,917,442 | A | * | 4/1990 | Johnson | 301/113 |
| 4,921,276 | A | * | 5/1990 | Morin | 280/848 |
| 5,000,614 | A | * | 3/1991 | Walker et al. | 403/326 |
| 5,074,592 | A | * | 12/1991 | White | 280/851 |
| 5,199,811 | A | * | 4/1993 | Huang | 403/108 |
| 5,460,411 | A | | 10/1995 | Becker | |
| 5,462,324 | A | * | 10/1995 | Bowen et al. | 293/15 |
| 5,735,560 | A | * | 4/1998 | Bowen et al. | 293/15 |
| 5,779,386 | A | * | 7/1998 | Eichhorn | 403/329 |
| 5,961,148 | A | * | 10/1999 | Cheng | 280/851 |
| 6,007,102 | A | * | 12/1999 | Helmus | 280/849 |
| 6,152,469 | A | * | 11/2000 | Gadowski | 280/154 |
| 6,367,841 | B1 | * | 4/2002 | Matthew | 280/847 |
| 6,648,373 | B2 | * | 11/2003 | Hawes | 280/854 |

* cited by examiner 3
4
7
8
8a
8b
9
10
30
31
34
A

ATTACHMENT MEANS AND ATTACHMENT ASSEMBLY

This application is the U.S. national phase application of PCT International Application No. PCT/GB01/00696 filed Feb. 19, 2001.

This invention relates to an attachment means and attachment assembly for the selectively releasable attachment of a first member to a second member. More specifically but not exclusively, the invention relates to an attachment means and attachment assembly for the selectively releasable attachment of a mudguard to a vehicle, or for the selectively releasable attachment of a guard to a machine, or for the selectively releasable mutual attachment of two pieces of scaffolding, or for the selectively releasable mutual attachment of any two articles or members in respect of which mutual attachment and subsequent mutual release is to be facilitated.

In the context of cargo-transporting road vehicles travelling on wheels fitted with respective pneumatic tyres, each outer tyre on the rear wheels of a heavy goods vehicle or trailer usually has an arched cover or mudguard shrouding the top of the tyre to inhibit spray arising from travel on wet roads. The mudguard is normally fixedly attached to the chassis or frame of the vehicle and precludes ready access to the wheels and tyres (e.g. for changing a wheel in the event of a tyre puncture). The mudguard also precludes necessary access to the tyres, brakes, air springs, and/or mechanical springs of the vehicle for mandatory inspections of roadworthiness. According to current legislation in the United Kingdom, a cargo-transporting road vehicle must be subjected to monthly inspection for roadworthiness, but, with conventional mudguard attachments, it currently takes from 1.5 to 2 hours to dismantle a mudguard for requisite access to parts of the vehicle that must be inspected.

A different problem also arises with such cargo-transporting road vehicles in that their cargo-carrying trailers expose large undersurfaces to turbulent winds, rendering the vehicles liable to be blown over in high winds. The fitting of side skirts to trailers would mitigate this hazard, as well as reducing drag in normal travel, but such side skirts would increase the problems of access to certain parts of the vehicle. Similar access considerations also apply to underrun barriers to prevent relatively small motor vehicles (e.g. ordinary automobiles) entering spaces under cargo-transporting vehicles (which are usually the largest road vehicles in common use).

Factory machines (e.g. machine tools for shaping metal) are normally required by law to include one or more guards suitably located to prevent a machine operator being injured by inadvertent contact with moving parts of the machine. Such machine guards are commonly bolted in place, and are an impediment to access to the normally guarded parts of the machine for adjustment, tool-setting, inspection, maintenance (e.g. cleaning and lubrication), or repair. Removal and subsequent replacement of machine guards is therefore time-consuming and thus expensive.

According to a first aspect of the present invention there is provided attachment means for the selectively releasable attachment of a first member to a second member, said attachment means comprising a socket means either forming part of said second member or adapted to be secured to said second member, said socket means being adapted to receive and releasably to retain a plug means attached to or forming part of said first member, said socket means comprising a selectively operable latch means functioning in use of the attachment means selectively either to latch said plug means within said socket means or to unlatch said plug means from said socket means.

According to a second aspect of the present invention there is provided an attachment assembly for the selectively releasable attachment of a first member to second member, said attachment assembly comprising a plug means either forming part of said first member or adapted to be secured to said first member, socket means either forming part of said second member or adapted to be secured to said second member, said socket means being adapted to receive and releasably to retain said plug means, said socket means comprising a selectively operable latch means functioning in use of the attachment assembly selectively either to latch said plug means within said socket means or to unlatch said plug means from said socket means.

In both said first and second aspects of the present invention said socket means preferably comprises an internally hollow socket whose transverse cross-section is preferably a close clearance fit around the plug means. Said plug means preferably has the form of a rod which is preferably substantially circular in cross-section. Said rod may be internally solid or hollow, e.g. tubular. Said latch means may comprise an axially slidable latch pin adapted to engage a notch in the rod or other form of plug means, and a spring disposed axially to bias the latch pin into latching engagement with the notch. The latch pin preferably has a head at one end of the pin, and a shaft of lesser lateral dimensions than those of said head. The latch pin may have a substantially circular cross-section at all points along its length, and the latch pin shaft preferably has a uniform diameter such that the only part of the latch pin having lateral dimensions greater than those of the shaft is the latch pin head at the one end of the pin. The latch pin may have button means at the opposite end from the head.

The latch pin is preferably disposed in relation to the socket such that the axis along which the latch pin is slidable is substantially parallel to a tangent to the periphery of the bore of the socket and radially offset outwards of the periphery of the bore of the socket by not less than half of the diameter of the latch pin shaft. Within the latch means, the spring may be disposed to bear against the head of the latch pin, the spring preferably being a compression spring bearing axially against the end of the head longitudinally opposite the end from which the shaft extends.

The attachment means is preferably configured for ease of access to the latch means, and the attachment means may have alternative configurations that are respectively right-handed and left-handed in respect of the disposition of the latch means relative to the socket means.

Preferably the notch in said rod comprises a circumferential groove. Said latch means is preferably such that the latch pin engages with said groove such as positively to retain the rod in the socket.

Said first member may be a part of a vehicle or an accessory for a vehicle, and said second member may be the frame or chassis of the vehicle. Alternatively said first member may be a machine guard or an accessory for a machine, and said second member may be the machine (e.g. a machine tool).

According to a third aspect of the present invention there is provided a mudguard assembly for use on a road vehicle supported on wheel arrangements that are respectively single-wheel or twin-wheel arrangements, said mudguard assembly comprising a mudguard and an attachment assembly for releasably attaching the mudguard to the frame of a vehicle such as to dispose the mudguard to shroud a selected wheel arrangement, said attachment assembly comprising an attachment assembly according to the second aspect of the present invention. The mudguard preferably comprises at least one transverse tubular support having an inboard end constituting the plug means of the attachment assembly. The socket means of the attachment assembly is preferably permanently secured to a frame member of the vehicle adjacent said selected wheel arrangement. The mudguard assembly may be such that the mudguard has two such transverse tubular supports at spaced-apart locations thereon, and two hollow tubular sockets permanently secured to the frame member at corresponding locations.

Said mudguard may have the form of a unitary mudguard adapted to shroud the upper part of the tyre or tyres together with at least the upper part of the outer face of the wheel (in a single-wheel arrangement) or at least the upper part of outer face of the outer wheel (in a twin-wheel arrangement). Preferably said unitary mudguard envelops at least 50% of the tyre on the single wheel, or of the tyre on the outer wheel of a twin-wheel arrangement. More preferably the unitary mudguard envelops 65% to 70% of the tyre on the single wheel or of the tyre on the outer wheel of the twin-wheel arrangement.

The mudguard may comprise a skirt attached along at least part of its lower edge. Preferably the mudguard comprises a skirt attached along its lower edges at the front, rear, and outer side. This skirt may comprise bristle strips.

The unitary mudguard is preferably an integral plastics moulding, but may alternatively be moulded of a polycarbonate compound, or be a metal pressing or a metal fabrication.

According to a fourth aspect of the present invention there is provided a side skirt assembly for use on a road vehicle, said side skirt assembly comprising a side skirt and an attachment assembly for releasably attaching the side skirt assembly to the frame of the vehicle such as to dispose the side skirt to shroud a selected region under the vehicle, said attachment assembly comprising an attachment assembly according to the second aspect of the present invention. The side skirt preferably comprises at least one tubular support extending from the side skirt to the vehicle frame, the tubular support having an end remote from the side skirt formed to constitute the plug means of the attachment assembly. The socket means of the attachment assembly is preferably permanently secured to a frame member of the vehicle. The side skirt assembly may be such that the side skirt has a plurality of such tubular supports at spaced-apart locations thereon, and a like plurality of hollow tubular sockets permanently secured to the frame member at corresponding locations.

Said side skirt assembly may comprise a cover adapted to shroud the upper part of the outer face of the wheels of the vehicle. Preferably said cover extends down over at least 50% of the outer face of the tyre on a single wheel, or of the tyre on the outer wheel of a twin-wheel arrangement. More preferably the cover extends down over 65% to 70% of the outer face of the tyre on the single wheel or of the tyre on the outer wheel of a twin-wheel arrangement.

According to fifth aspect of the present invention there is provided an under-run barrier assembly for use on a road vehicle, said under-run barrier assembly comprising an under-run barrier and an attachment assembly for releasably attaching the under-run barrier to the frame of the vehicle such as to dispose the barrier to inhibit access to space under the vehicle, said attachment assembly comprising an attachment assembly according to the second aspect of the present invention.

Said under-run barrier of the fifth aspect of the present invention may be combined with the side skirt of the fourth aspect of the present invention to form a cover assembly. Said cover assembly may incorporate a cover that extends from the top of a wheel downwards for a distance of at least 50% of the height of the wheel, and more preferably the cover extends downwards over 65% to 70% of the height of the wheel. The cover is preferably an integral plastics moulding, but may alternatively be moulded of a polycarbonate compound, or be a metal pressing or a metal fabrication. Said cover may comprise at least two panels that may be configured to permit adjustment of the overall size of the cover. The cover may comprise at least two overlapping panels configured to undergo telescopic sliding relative to each other so as to vary the overall size of the cover. In a preferred arrangement, the cover comprises a first panel having a respective channel formed along each of its top and bottom edges, and a second panel configured to mate with said first panel such as to slide in said channels for telescopic adjustment of the cover size.

According to a sixth aspect of the present invention there is provided a cargo-transporting road vehicle, said vehicle incorporating at least one mudguard assembly according to the third aspect of the present invention, and/or at least one side skirt assembly according to the fourth aspect of the present invention, and/or at least one under-run barrier assembly according to the fifth aspect of the present invention.

Embodiments of the present invention will now be described by way of example, with reference to the accompanying drawings wherein.

Figures 4A, 4B, 4C, 4D, 4E, 5, 6A, 6B, 7A, 7B, 8A, 8B:
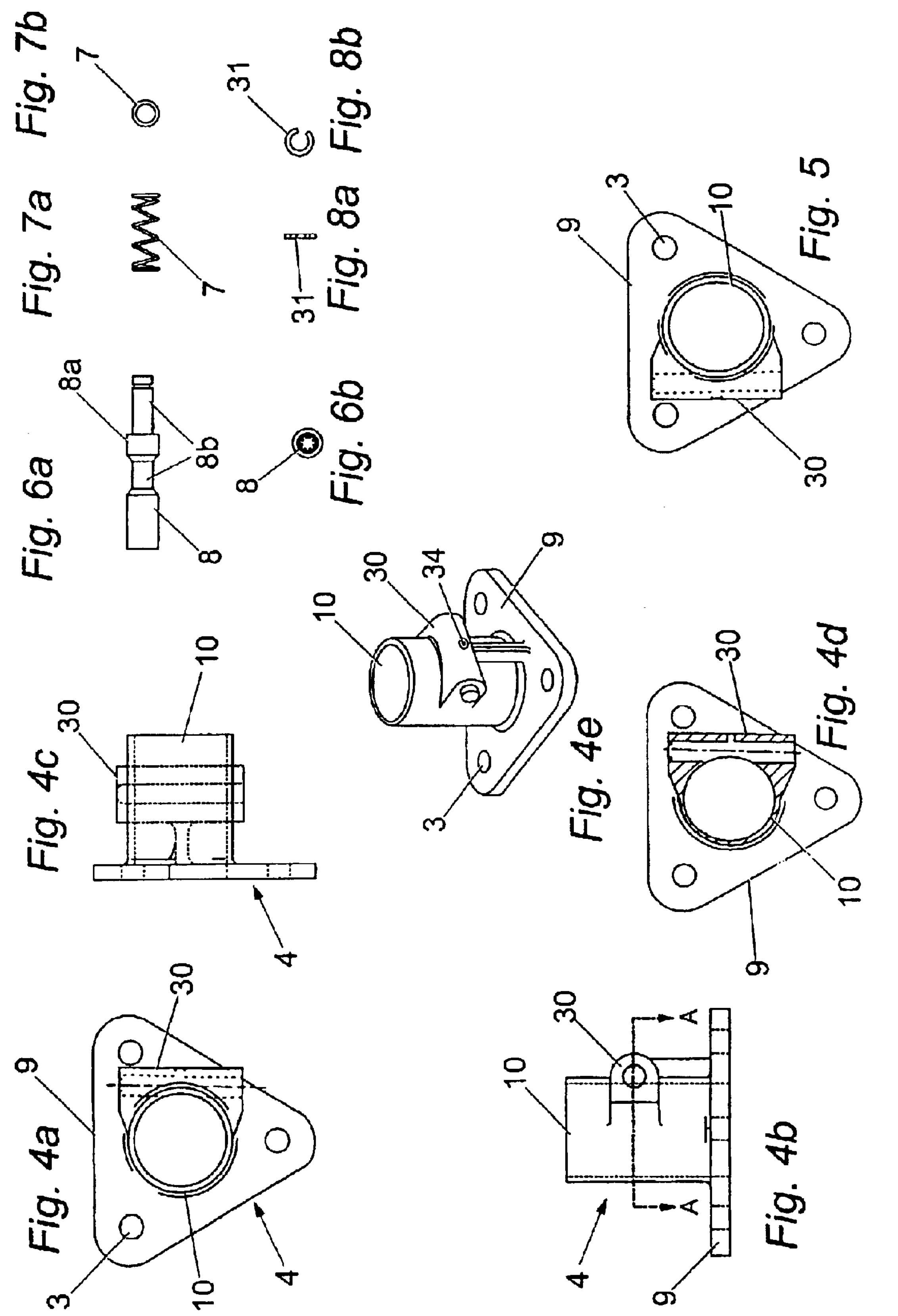

FIG. 4*a* is a front elevation of a second embodiment of socket and latch, in a right-handed configuration;

FIG. 4*b* is a plan view of the second embodiment;

FIG. 4*c* is a side elevation of the second embodiment;

FIG. 4*d* is a section through the second embodiment, taken on the line A—A in FIG. 4*b;*

FIG. 4*e* is a perspective view of the second embodiment;

FIG. 5 is a front elevation of the second embodiment, but in a left-handed configuration;

FIG. 6*a* is a side elevation of a latch pin forming part of the latch of the second embodiment;

FIG. 6*b* is an end elevation of the latch pin of FIG. 6*a;*

Figure 9:
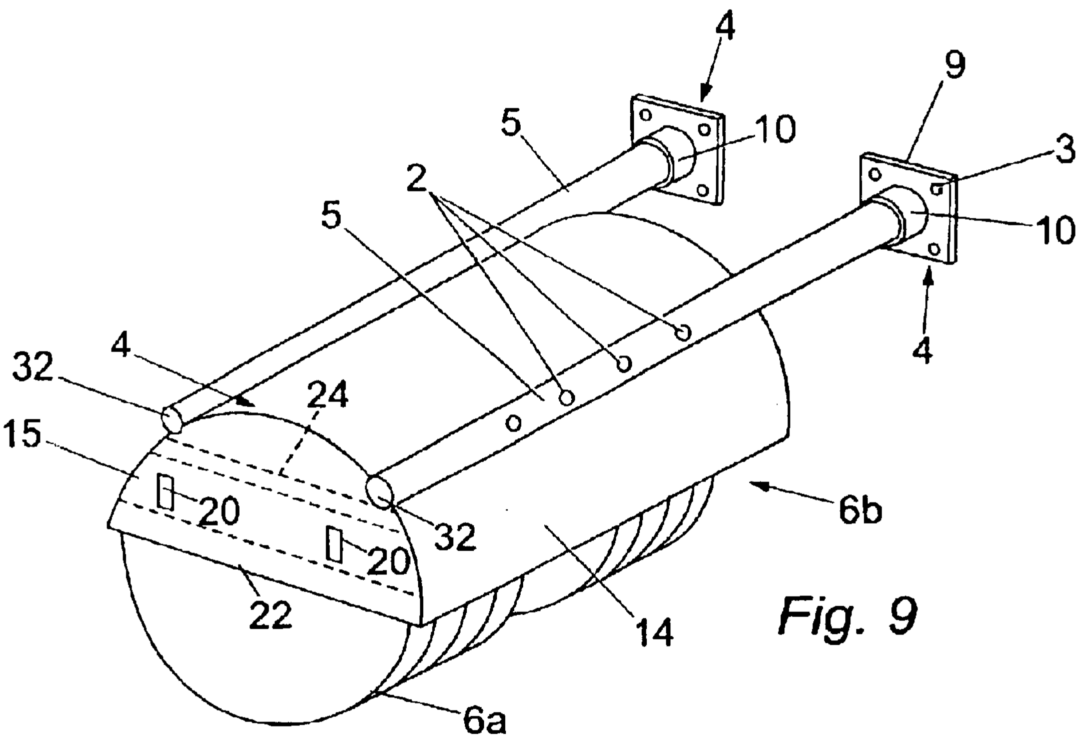
Figure 10:
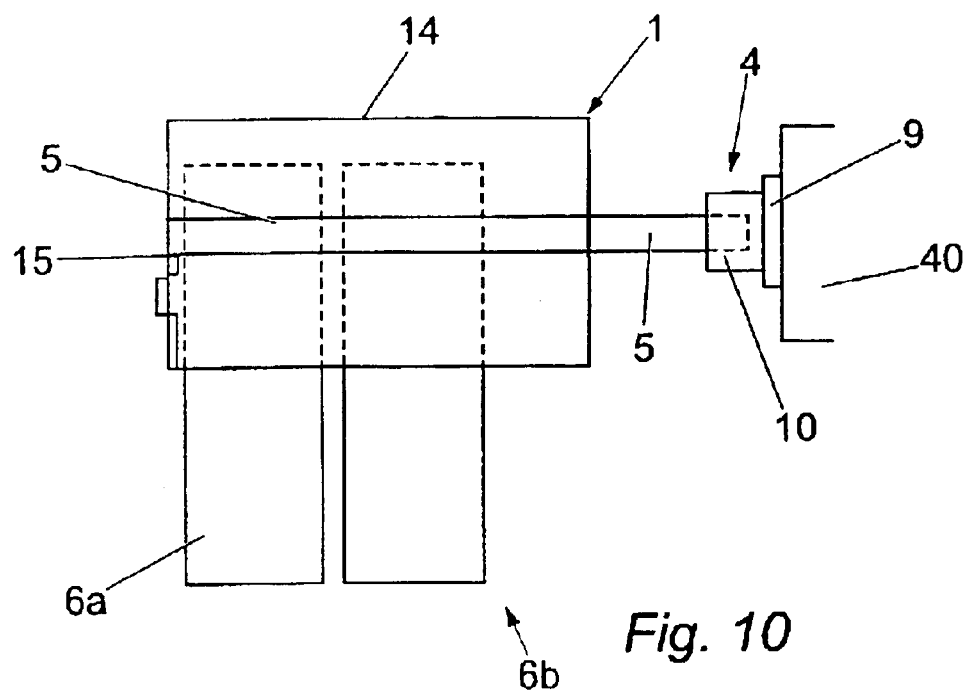
Figure 11:
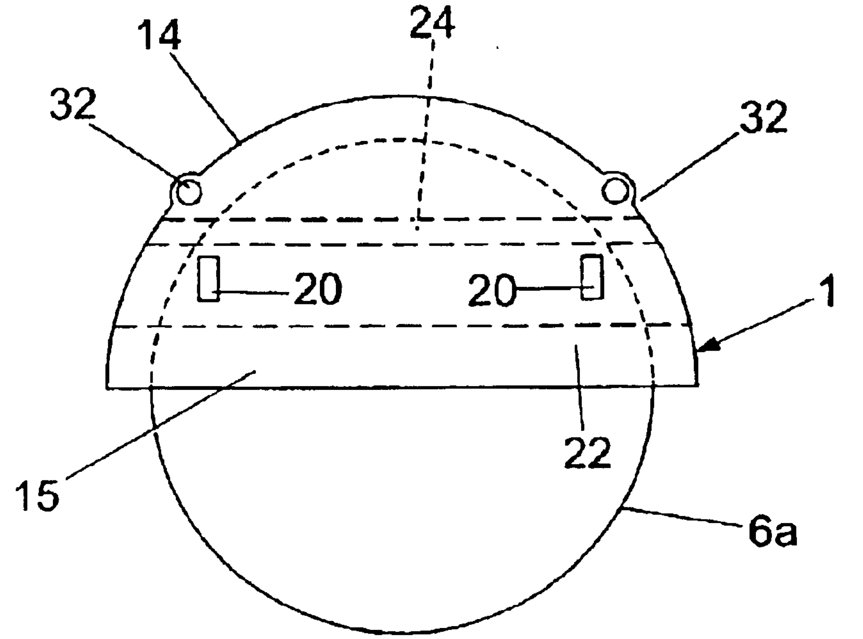
Figure 12:
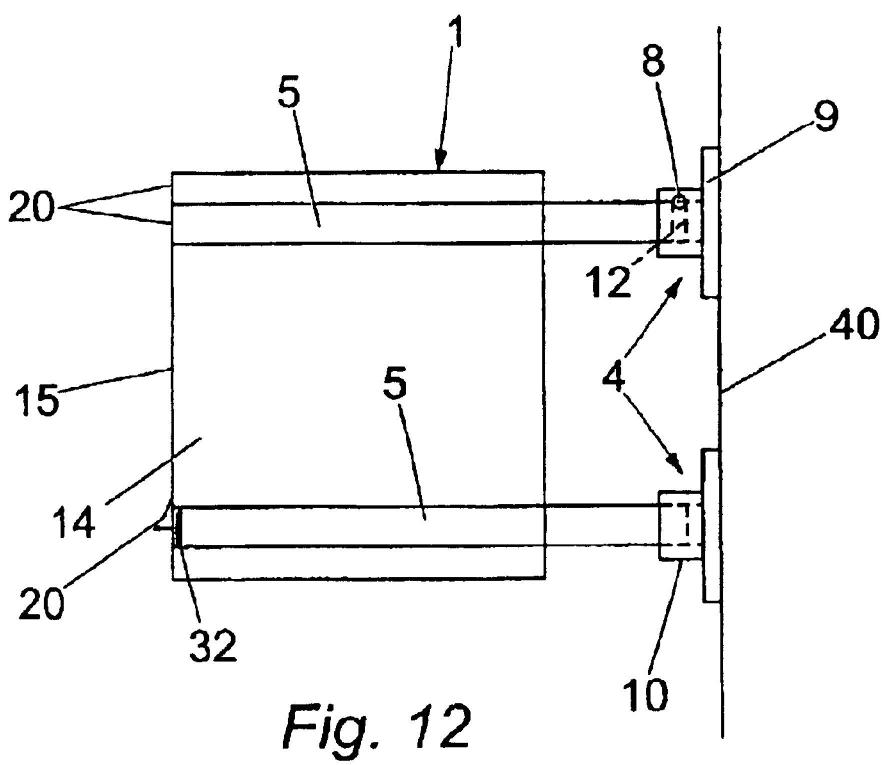
Figure 13:
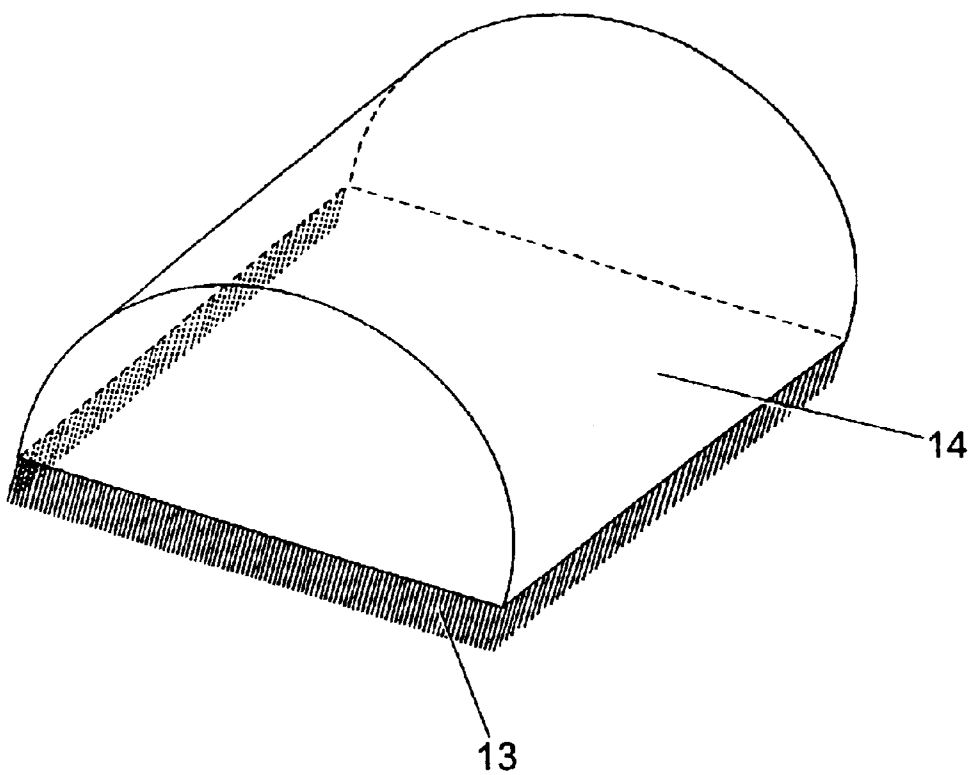
Figure 16:
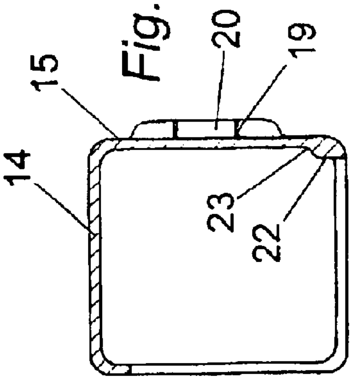
Figure 19:
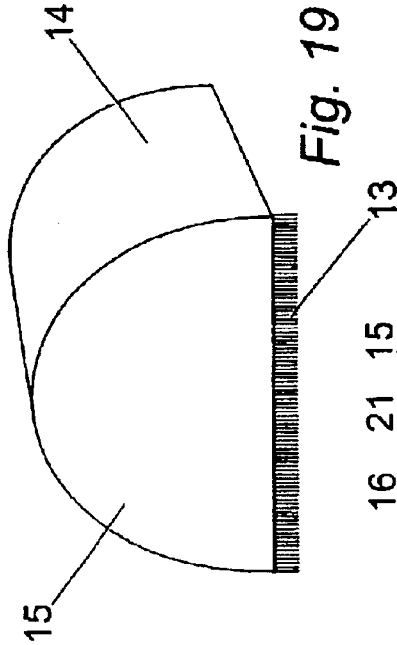
Figure 17:
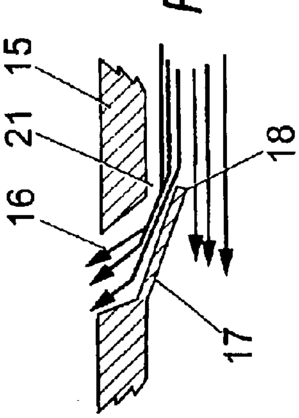
Figure 14:
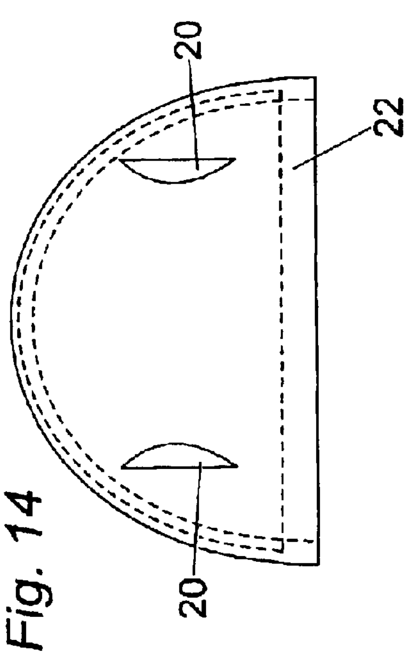
Figure 15:
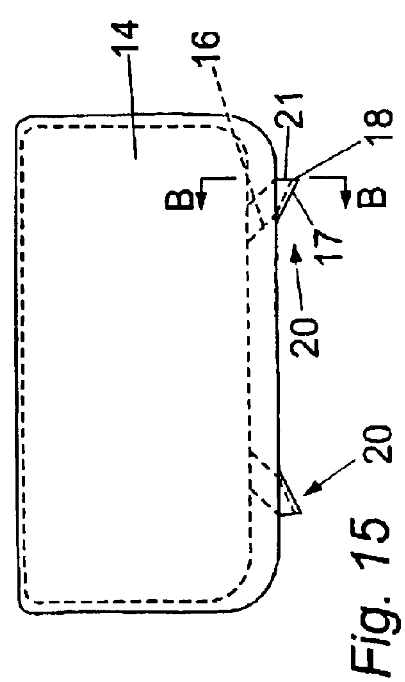
Figure 18:
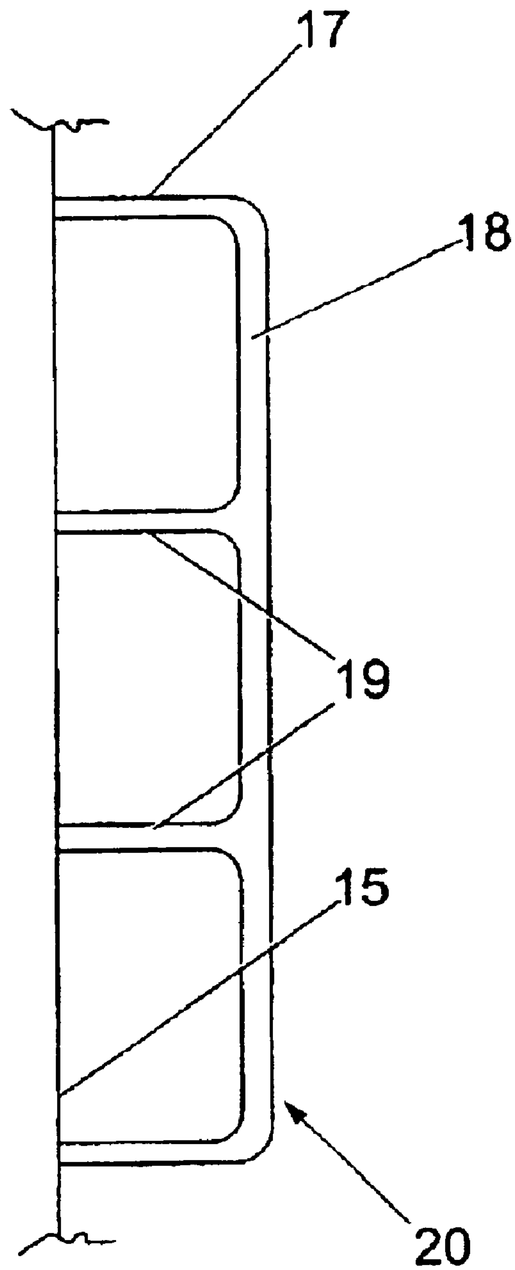
Figure 21:
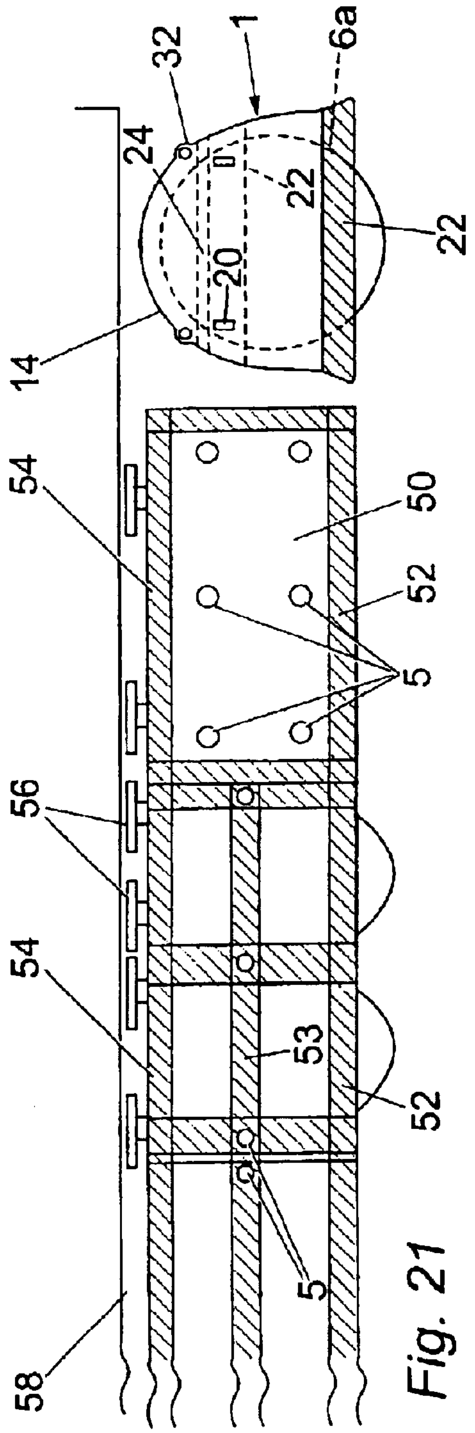
Figure 20:
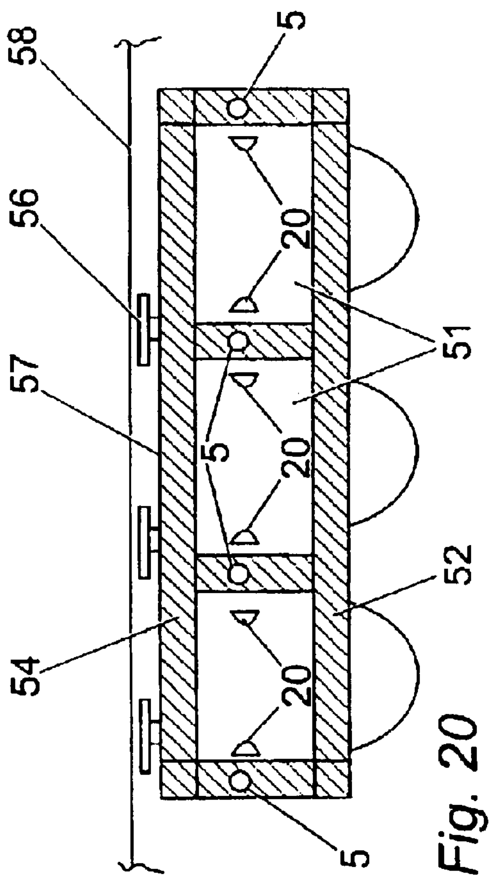
Figure 22A:
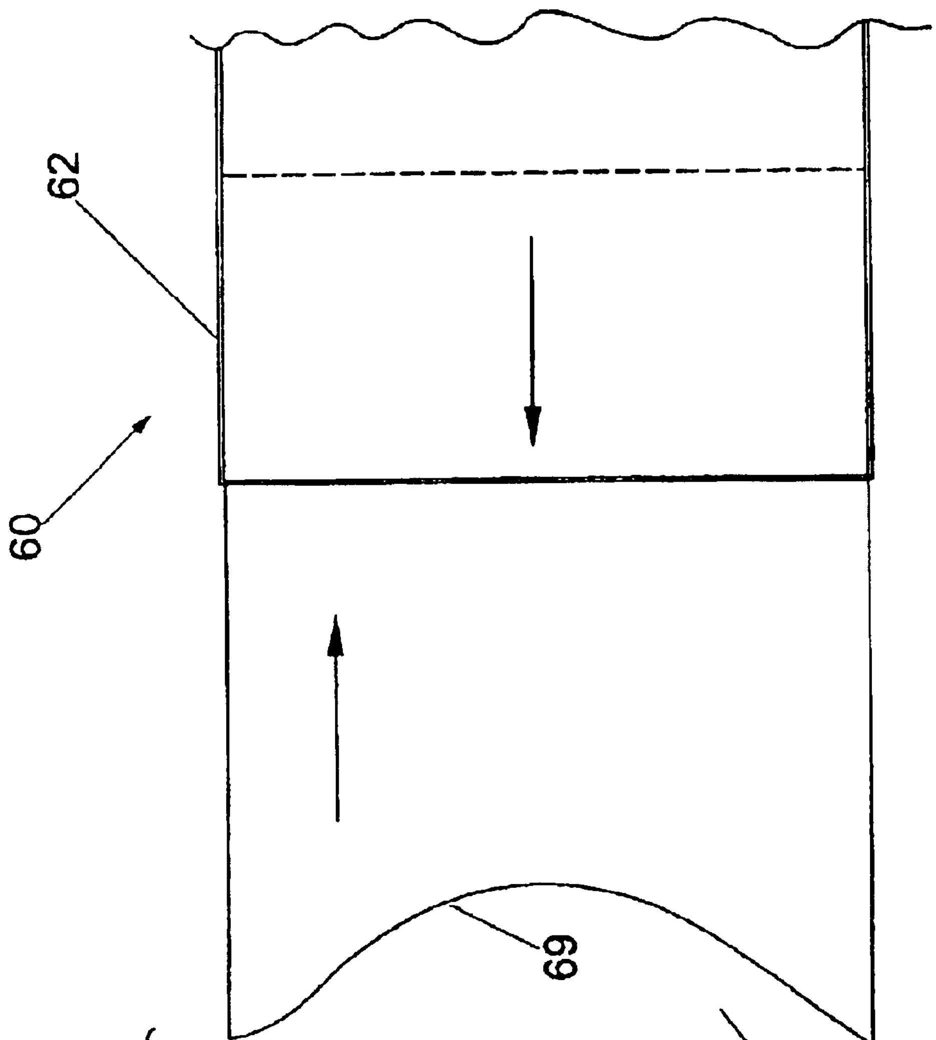
Figure 22B:
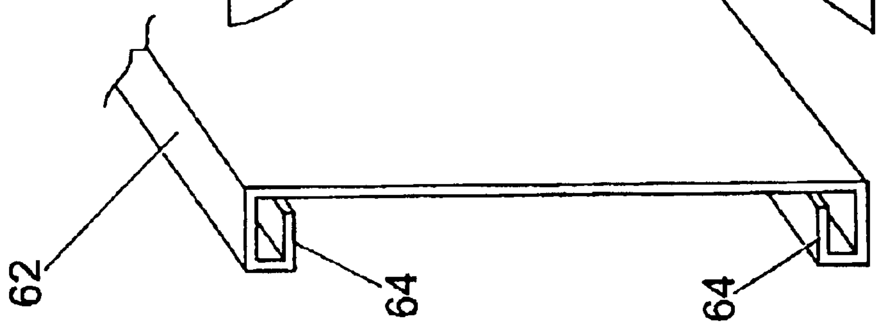

FIGS. 7*a* and 7*b* respectively show a side elevation and an end elevation of a spring forming part of the latch of the second embodiment;

FIGS. 8*a* and 8*b* respectively show a side elevation and an end elevation of a washer forming part of the latch of the second embodiment;

FIG. 9 is a perspective view of an embodiment of mudguard assembly in situ on a vehicle;

FIG. 10 is a rear view of the mudguard assembly of FIG. 9;

FIG. 11 is a side view of the mudguard assembly of FIG. 9;

FIG. 12 is a plan view of the mudguard assembly of FIG. 9;

FIG. 13 is a perspective view of a modification of the mudguard of the assembly of FIG. 9 to include a skirt;

FIG. 14 is a side elevation of another embodiment of mudguard assembly;

FIG. 15 is a plan view of the mudguard assembly of FIG. 14;

FIG. 16 is a cross-section of the mudguard assembly of FIG. 14, taken on the line B—B in FIG. 15;

FIG. 17 is a fragmentary sectional view, to an enlarged scale, of a vent in the mudguard assembly of FIG. 14, showing directions of air flow through and past the vent;

FIG. 18 is a front view, to an enlarged scale, of the vent in the mudguard assembly of FIG. 14, showing structural support members of the vent;

FIG. 19 is a perspective view of a modification of the mudguard assembly of FIG. 14 to include a skirt;

FIG. 20 is a side view of an embodiment of a combined side-skirt and under-run barrier assembly in situ on a vehicle;

FIG. 21 is a side view of another embodiment of cover assembly including a combined side-skirt assembly and mudguard assembly in situ on a vehicle;

FIG. 22*a* is an elevation of a further embodiment of side-skirt assembly incorporating a telescopic cover;

FIG. 22*b* is a perspective end view of a first panel of the embodiment of FIG. 22*a;*

Figure 22C:
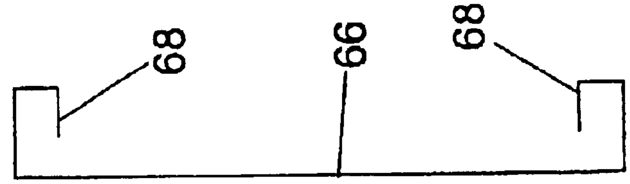

FIG. 22*c* is an end elevation of a second panel of the embodiment of FIG. 22*a;*

Figure 24:
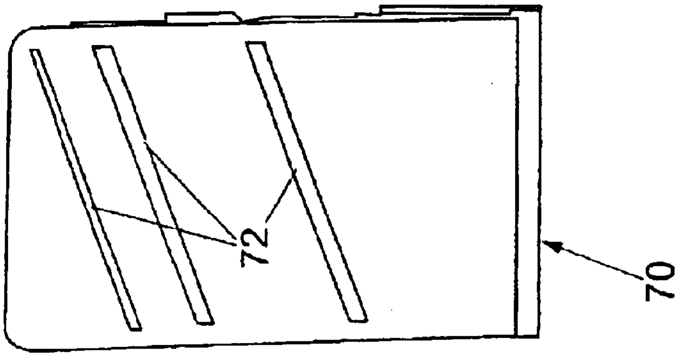
Figure 23:
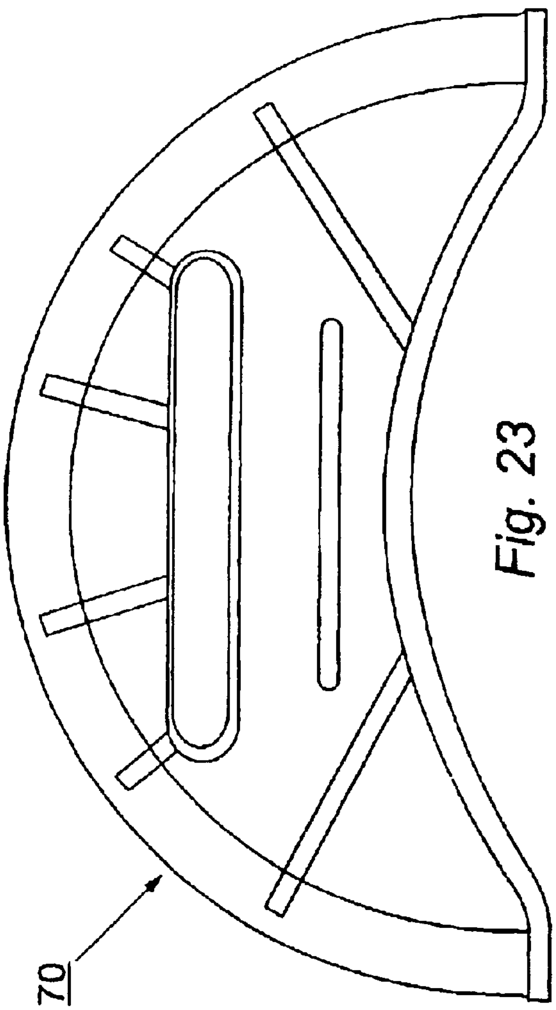
Figure 25:
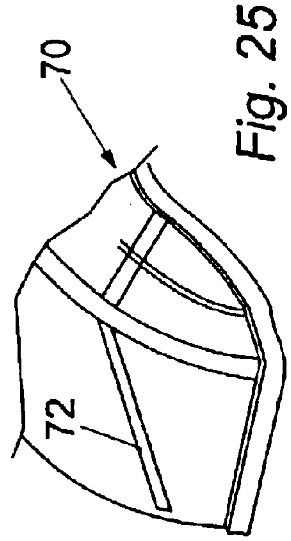
Figure 27:
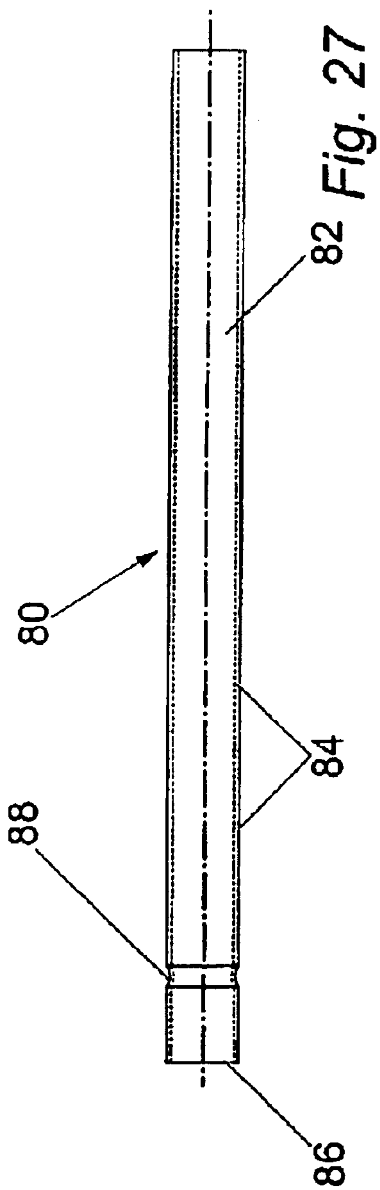
Figure 28:
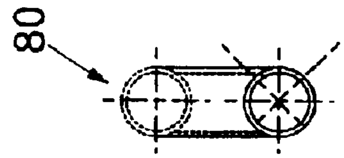
Figure 26:
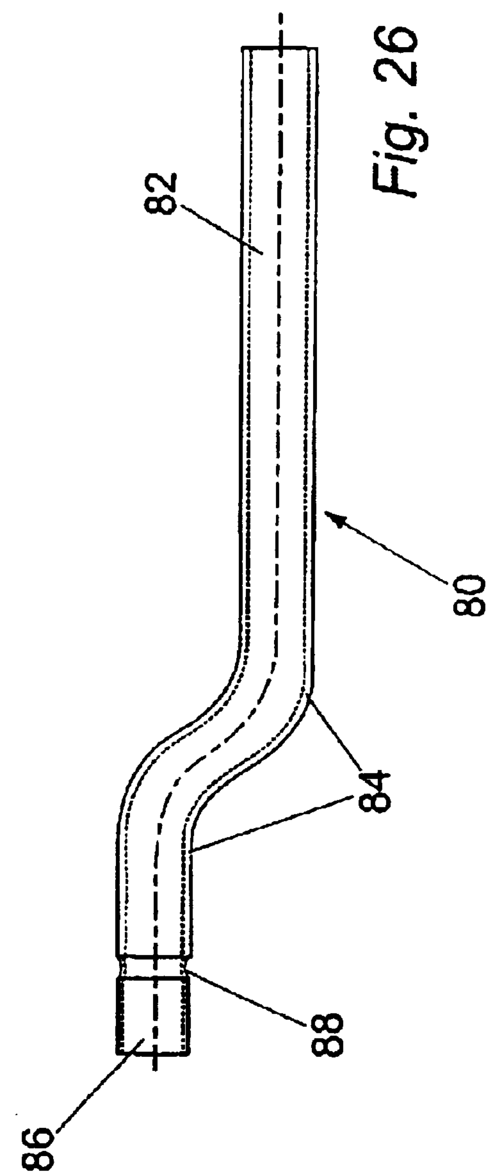

FIG. 23 is an elevation of a mudguard forming part of another embodiment of mudguard assembly;

FIG. 24 is a rear view of the mudguard of FIG. 23;

FIG. 25 is a perspective view of a detail of the mudguard of FIG. 23; and FIGS. 26, 27, and 28 are, respectively, a side elevation, a plan view, and an end elevation of a support member for the mudguard of FIG. 23.

In the exemplary embodiments, an attachment means for the releasable attachment of a first member to a second member comprises a socket that is either part of the second member or is adapted to be secured to the second member, wherein said socket is adapted to receive and releasably to retain a rod or other suitable form of plug member. This attachment means is suitable for releasably securing a vehicle part or a vehicle accessory (e.g. a panel, skirt or mudguard) to a vehicle, or a guard to a machine. The attachment assembly additionally comprises a rod or other plug member attachable to or forming part of said first member.

To prevent a car or the like from going under a cargo-transporting road vehicle in the event of a collision, a crash rail or under-run barrier is normally fitted on each side of a trailer or load-carrying platform to inhibit access to the space under the trailer or platform, particularly between wheel axles. Embodiments of the invention comprise a panel or panels adapted substantially to cover or replace the crash rail. These panel or panels form a continuous surface. Further embodiments of the invention comprise mudguard assemblies that substantially cover the outer face of a wheel or wheels of a vehicle. Side skirts are provided by another embodiment to streamline the vehicle, saving fuel, and also to prevent excess windflow under the trailer bed that tends to destabilise a trailer and may cause the vehicle to overturn in high winds.

The purpose of the attachment means and attachment assemblies of the invention is to attach a side skirt or crash rail to the vehicle frame or chassis, to attach a mudguard over the side of a wheel and/or around a wheel, a guard to a machine, or to enable mutual attachment of other articles while facilitating quick removal and re-attachment of the attached article. This facility considerably reduces the time and cost of inspections, maintenance, and repairs.

Figure 1:
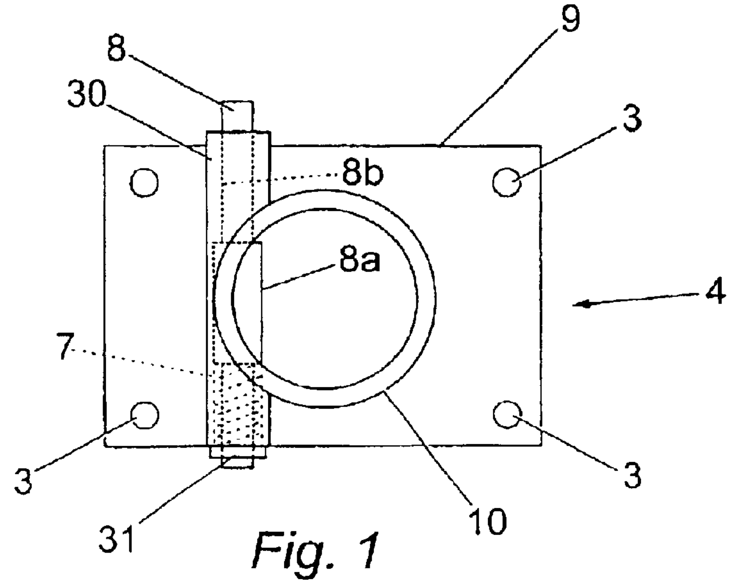
FIG. 1 is a front elevation of a first embodiment of socket and latch, in a locked position.
Figure 2:
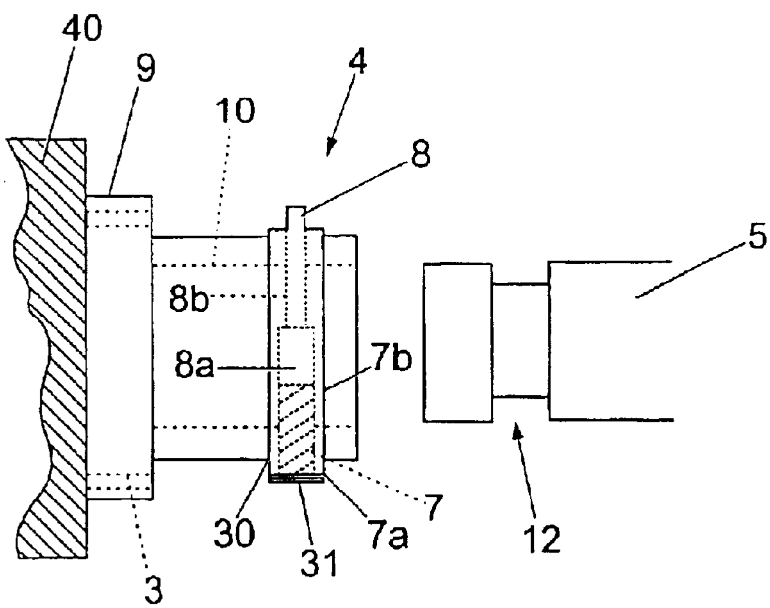
FIG. 2 is a side elevation of the embodiment of FIG. 1.

Referring now to FIGS. 1 and 2, these are simplified illustrations in face and end views, respectively, of a first embodiment of attachment means 4 and attachment assembly 4+5 in accordance with aspects of the invention. The attachment means 4 comprises a hollow cylindrical steel socket 10 mounted on a steel base plate 9 that has corner holes 3 by which the attachment means 4 can be bolted to the side of a vehicle's chassis or frame member 40. The socket 10 is fitted with a manually operable latch comprising a latch pin 8 having a cylindrical head 8*a* on the lower end of a cylindrical shaft 8*b*. The latch pin head 8*a* has a larger diameter but shorter length than the latch pin shaft 8*b*. The latch pin 8 is vertically slidable within a housing 30 that has a hollow cylindrical bore in which the cylindrical latch pin head 8*a* is a close sliding fit. The longitudinal axis of the bore of the latch pin housing 30 (i.e. the axis along which the latch pin 8 is slidable) lies parallel to a tangent to the periphery of the hollow cylindrical bore of the socket 10, the latch pin axis being offset radially outwards of this tangent by slightly more than half of the diameter of the latch pin shaft 8*b* but by less than half the diameter of the latch pin head 8*b*, for a purpose to be explained below. This tangential alignment of the housing 30 with respect to the cylindrical socket 10 means that the latch pin head 8*a* can move into and out of intersection with the bore of the socket 10, but the latch pin 8 is incapable of movement in a direction parallel to the axis of the socket 10. (The significance of this restriction on relative movement will be explained below).

A coiled compression spring 7 in the base of the housing 30 urges the latch pin 8 upwards within the housing 30. The spring 7 is retained in the lower end of the housing 30 by means of a circlip 31 whose central aperture allows drainage of moisture from the interior of the housing 30. The upper end of the housing 30 is centrally perforated by a circular aperture dimensioned to allow sliding passage of the latch pin shaft 8*b* but which prevents the latch pin 8 being moved above the position shown in FIGS. 1 and 2. In this uppermost position, the upper end of the latch pin 8 protrudes beyond the top of the housing 30 such that the pin 8 can be manually pushed downwards against the upward force of the spring 7. Due to the tangential intersection of the bores of the housing 30 and the socket 10, when the latch pin 8 is in its uppermost position, the latch pin head 8*a* lies partially within the hollow interior of the socket 10. When the latch pin 8 is fully depressed against the upward force of the spring 7, the latch pin head 8*a* is moved downwards to lie completely below the hollow interior of the socket 10, the location of the housing 30 and the lesser diameter of the latch pin shaft 8*b* being such that no part of the latch pin 8 still lies within the hollow interior of the socket 10.

The socket 10 and its associated parts constituting the attachment means 4 are designed to have a second member releasably attached thereto, as will now be detailed with specific reference to FIG. 2. The second member has a cylindrical solid steel rod 5 whose external diameter is a close sliding fit within the hollow cylindrical interior of the socket 10. The rod 5 can be an integral part of the article (not shown) to be attached to the attachment means 4, or the rod 5 can be a separate component suitably secured of the attachable article. The rod 5 is formed near its free end with a circumferential groove 12. In order to secure the rod 5 within the socket 10, the latch pin 8 is fully depressed by sustained manual downforce applied to the top end of the pin 8 such that the latch pin head 8*a* is held clear of the interior of the socket 10, the free end of the rod 5 is plugged into the socket 10, and finally the manual downforce on the latch pin 8 is discontinued. The spring 7 thereupon moves the latch pin 8 upwards within the housing 30, and the latch pin head 8*a* rises again to lie within the interior of the socket 10, on this occasion the latch pin head 8*a* entering the notch 12 on the plugged-in rod 5. In this configuration, the inability of the latch pin 8 to move in the axial direction of the socket 10 (as previously explained) latches the rod 5 and positively prevents the rod 5 leaving the socket 10 by reason of the latch pin head 8*a* lying within the notch 12 around the plugged-in end of the rod 5. If detachment of the rod 5 from the socket 10 is intended, it is only necessary for the pin 8 to be manually depressed such the latch pin head 8*a* is pushed below the socket bore and hence free of the notch 12, whereupon the rod 5 is unlatched for withdrawal from the socket 10.

If the rod 5 is maintained in a constant angular relationship with respect to the latch pin 8 of the respective attachment means 4 (e.g. as in the embodiment of FIGS. 9–12 to be subsequently described), the notch 12 need not extend around the entire circumference of the rod 5, and the notch then need only have some lesser extent, such as a notch cut along a secant of the rod 5 to match the bore of the latch pin housing 30.

The socket-plus-latch attachment means 4 can be supplied and installed on its own, for subsequent attachment of parts or accessories of the vehicle owner's choice, such parts or accessories being constructed or adapted to have respective notched rods or other suitable plug means for releasable attachment to the attachment means 4. On the other hand, the vehicle can be manufactured and supplied to a vehicle owner with the incorporation of one or more complete plug and socket attachment assemblies (4+5), e.g. for the releasable attachment of mudguard assemblies (as will subsequently be detailed). Thus the socket-plus-latch attachment means 4 is technically and commercially viable on its own, as is the complete plug and socket attachment assembly 4+5. It is expected that wear in an attachment assembly will be principally on the rod 5, such that usually only the rod 5 will need replacement for excessive wear, while the socket plus latch 4 will remain relatively unworn.

Figure 3:
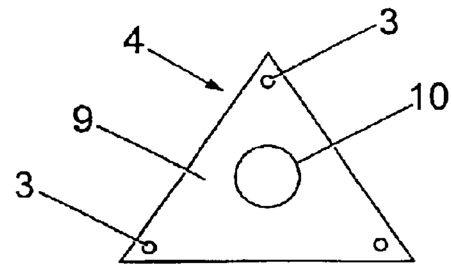
FIG. 3 is a front elevation of an alternative embodiment of the base of the socket.

FIG. 3 is a semi-schematic representation of a modified form of the attachment means 4, in which the base plate 9 is re-shaped to be triangular.

Another embodiment of attachment means is shown in FIGS. 4*a*–8*b*, in the form of a triangularly-based, right-handed configuration of socket and latch housing (FIGS. 4*a*–4*e*) but without the latch whose components are shown separately in FIGS. 6*a*–8*b*. In FIGS. 4*a*–8*b*, those components which are physically and/or functionally identical or analogous to components of the embodiments of FIGS. 1–3 are given the same reference numerals. For a description of any part of the embodiment of FIGS. 4*a*–8*b* not detailed below, reference should be made to the description of the corresponding parts of the previous embodiments. In contrast to the left-handed embodiment of FIGS. 1 & 2, the embodiment of FIGS. 4*a*–8*b* is right-handed, thus illustrating the ability of the attachment means to be re-configured without affecting its functioning. Depending on the location on the vehicle of the attachment means 4 and on obstruction by adjacent parts of the vehicle, either a left-handed or a right-handed arrangement can be selected for installation to ease manual access to the latch pin 8 for its depression during unlatching and detachment. It is important that, in use the assembly is positioned such that the spring is below the pin 8. That is although in theory either a right-handed or a left handed arrangement could be mounted upside down for ease of access from the 'wrong' side, this has the unacceptable safety risk that, in the event that the circlip breaks or rusts, the pin 8 could fall out. That is, separate left- and right-handed arrangements are essential for safety requirements so that the pin remains in place even if the circlip fails.

In the embodiment of FIGS. 4*a*–8*b*, the latch housing 30 is fitted with a grease nipple 34 for the application of lubricant to the latch pin 8, thereby to promote reliable operation of the latch.

FIGS. 9–12 illustrate a practical application of the embodiments of attachment means and attachment assembly so far described, in the form of a mudguard assembly 1. The mudguard assembly 1 comprises an individual mudguard or tyre shroud 14 shaped and dimensioned to be a clearance fit over the outboard and inboard tyres 6*a* and 6*b* of a twin-wheel arrangement of a cargo-transporting road vehicle (not otherwise shown in FIGS. 9–12). Two steel tubes 5 are secured to the shroud 14 by fasteners 2, the tubes 5 extending inboard of the shroud 14. The inboard ends of the tubes 5 are each plugged into the socket 10 of a respective socket-plus-latch attachment means 4 (e.g. as described with reference to FIGS. 1 & 2, and depicted in simplified form in FIGS. 9–12). The attachment means 4 are each bolted onto the vehicle frame member 40 (FIGS. 10 & 12). The tubes 5, which are an integral part of the mudguard assembly 1, thus form respective parts of twin attachment assemblies, for which purpose the inboard ends of the tubes 5 are each formed with a respective notch (not shown in FIGS. 9–12 but equivalent to the notch 12 in FIG. 2). The outboard end of each tube 5 is plugged with a respective plastics cap 32 to inhibit ingress of water and grit.

The outboard end face 15 of the shroud 14 is internally stiffened by rigid strips 22 and 24. Airflow around the tyres 6*a* & 6*b*, and cooling of the wheel brakes (not shown), is enhanced by air vents 20 in the end face 15. The symmetrical arrangement of the air vents 20 enables a single mould to be utilised for the production of mudguards for use on both sides of a vehicle. In this embodiment of mudguard assembly 14, the shroud 14 envelops 65%–75% of the outer wheel and its tyre 6*a*, but the mudguard may be arranged to cover any other suitable fraction of the tyres and wheels, preferably to provide in excess of 50% coverage.

The use of plug and socket attachment assemblies 4+5 enables the mudguard assembly 1 to be rapidly yet reliably attached to the vehicle frame member 40. Subsequent detachment of the mudguard assembly 1 from the frame member 40 for inspection, maintenance, or repair of the vehicle is also rapid and easy.

FIG. 13 shows part of another embodiment of mudguard assembly, comprising the shroud 14 of the mudguard assembly 1 of FIGS. 9–12 modified by the addition of bristle strips or brush seals 13 to the lower edges of the shroud 14 at its front, side, and rear. The bristles in the bristle strips 13 have lengths in the range 100–150 millimetres, and serve to reduce spray arising from travel on wet roads by downwardly extending the lower edges of the mudguard assembly 1.

FIGS. 14–16 show part of a further embodiment of mudguard assembly, comprising a form of the shroud 14 specifically adapted for use over the tyre on a single wheel (not shown in FIGS. 14–16). In this embodiment, the air vents 20 (shown in enlarged detail in FIGS, 17 & 18) each have an outwardly projecting scoop 17 directing air into the vent opening 16 in the shroud's side face 15, leading to the interior of the shroud 14. The respective scoops 17 of the two vents 20 point in opposite directions of travel. The leading one of the pair of vents 20 (i.e. the vent having a scoop 17 whose outer edge 18 leads into oncoming airstream as depicted in FIG. 17) diverts a jet 21 of ambient air into the interior of the shroud 14. The vents thus enhance the flow of air to the interior of the mudguard assembly for improved cooling of brakes, etc. Intermediate members 19 (FIG. 18) support the leading edges 18 of the scoops 17 against unwanted distortion by wind forces. As with the embodiment of FIGS. 9–12, the arrangement of vents 20 in the embodiment of FIGS. 14–18 allow a single mould to be used for mudguards to be fitted on either side of the vehicle, since the scoop 17 of one of the two vents 20 will always directed into oncoming air and hence scooping air into the mudguard shroud.

FIG. 19 shows a modification of the embodiment of FIGS. 14–18, in which the side face 15 of the shroud 14 is fitted with a bristle strip 13 along its lower edge. This modification is analogous to the FIG. 13 modification of the embodiment of FIGS. 9–12, and for similar purposes, namely downward extension of mudguard coverage and enhanced inhibition of spray.

FIG. 20 is a side view of the wheel region of a triple-axle load-carrying trailer of an articulated cargo-transporting road vehicle (not otherwise shown) with a side skirt assembly in place over the wheels, while FIG. 21 is a side view of a twin-axle load-carrying trailer of a cargo-transporting road vehicle whose tractor driving wheel is shown with fitted mudguard assembly 1 (as detailed in FIGS. 9–12), with side-skirt and under-run barrier assembly in place. In these further embodiments illustrated in FIGS. 20 and 21, a side-skirt assembly comprises an array of inwardly projecting attachment rods 5 for releasably securing panels 50 and 51 to a vehicle. (In FIGS. 20 & 21, the socket plus latch attachment means (4) corresponding to the array of rods 5 are not visible but have matching positions). An under-run barrier of crash rails 52, 53, and 54 is installed on the-sides of trailers, or on the sides of self-propelled road vehicles, under the vehicle's cargo-carrying platform 58 in the gaps between axles and also over the wheels themselves. The purpose of the panels 50 and 51 is to cover the sides of the wheels and the crash rails 52–54 such as to form a windshield and reduce drag on the vehicle's movements by reducing air turbulence. The panels 50 and 51 are formed of polycarbonate material and manufactured as unitary mouldings. The panels 50 and 51 have hinges 56 along their top edges 57 for attachment to the load platform 58. The panels 50 and 51 are secured over the wheels and crash rail by attachment assemblies 5 as previously detailed.

Side-skirt assemblies including one or more panels 50 and 51 can be retrofitted to load-transporting trailers and self-propelled vehicles. The attachment assemblies 5 permit quick release of the panels 50 and 51, while the panels remain attached to the load platform 58 along the panel top edges 57, so that the panels can be swung upwards, clear of the underside of the load platform 58 to enable easy access for inspection, maintenance, or repair.

A modified form of side-skirt panel assembly 60 is shown in FIGS. 22*a*–22*c*. The panel assembly 60 (FIG. 22*a*) comprises a first horizontally elongated rigid sheet 62 (FIG. 22*b*) formed with a respective channel 64 along its top and bottom edges. The panel assembly 60 further comprises a second horizontally elongated rigid sheet 66 (FIG. 22*c*) whose top and bottom edges 68 are folded into approximately rectangular forms that are sliding fits within the channels 64 of the first panel 62. The assembly 60 is made up by attaching the first panel 62 to the side-frame of a vehicle (not shown in FIGS. 22*a*–22*c*) by means of a suitably emplaced array of attachment assemblies (not shown in FIGS. 22*a*–22*c*), telescopically fitting the second panel 66 onto the first panel 62 such that the folded edges 68 slide within the channels 64, and sliding the second panel 66 relative to the first panel 62 until the panel assembly 60 as a whole has a requisite length. The trailing end 69 of the second panel 66 can be scalloped as shown in FIG. 22*a* in order to be a close clearance fit around the periphery of a tyre (not shown in FIG. 22*a*) and/or for aesthetic reasons.

A modified form of mudguard 70 is shown in FIGS. 23, 24, and 25. The mudguard 70 is a unitary plastics moulding somewhat similar to the wheel shroud 14 of FIGS. 14–16, but differs in being externally formed with projecting ribs or strakes 72 angled to deflect water on the external surface of the mudguard 70 in a direction inwards of the vehicle, causing the water to run into the middle of the road between axles, so reducing spray during travel on wet roads.

The mudguards and/or side-skirts and/or side panels of any of the previously described embodiments may have one or more strips of self-adhesive reflective tape (also known as "conspicuity tape") adhered to surfaces that are externally visible, for enhanced visibility, particularly at night, as a contribution to road safety.

FIGS. 26–28 show a modified form of mudguard support 80, in the form of a steel rod 82 that is cranked in region 84 just inboard of a mudguard (not shown in FIGS. 26–28) that is to be supported by the support 80. The inboard end 86 of the rod 82 is formed with a circumferential groove 88 for co-operative interaction with the latch pin of an attachment means such as that shown in FIGS. 4*a*–4*e*. A mudguard assembly utilising the support 80 will have a pair of the rods 82 attached to the mudguard at suitable locations, for example as depicted in FIG. 9.

In addition to the vehicular applications detailed above, the attachment means and attachment assembly of the invention have a wide variety of other applications. For example, the easy attachment and quick release facilitated by the attachment assembly of the invention makes it suitable for the attachment or coupling of safety guards to industrial machinery, the mutual attachment of scaffolding tubes, attachment of awnings over shop windows, rapid erection and dismounting of safety fences on building sites, and mutual attachment of members or articles in general, particularly but not exclusively where one of the articles has a tubular projection.

While certain modifications and variations of the invention have been described above, the invention is not restricted thereto, and other modifications and variations can be adopted without departing from the scope of the invention as defined in the appended claims.

What is claimed is:

1. An attachment assembly for the selectively releasable attachment of a first member to second member, said attachment assembly comprising:

a plug means in the form of a rod of substantially circular cross-section, said rod forming part of said first member or adapted to be secured to said first member;

socket means either forming part of said second member or adapted to be secured to said second member, said socket means having a bore in which said plug means is received and releasably retained;

said socket means comprising a selectively operable latch means functioning selectively to latch said plug means within said socket means and to unlatch said plug means from said socket means;

said latch means comprising an axially slidable latch pin adapted to engage a notch in the rod, and a spring disposed axially to bias the latch pin into latching engagement with the notch;

the latch pin having a head at one end of the pin, and a shaft of lesser lateral dimensions than those of said head, the latch pin having a substantially circular cross-section at all points along its length, and the latch pin shaft having a uniform diameter such that the only part of the latch pin having lateral dimensions greater than those of the shaft is the latch pin head at the one end of the pin;

and in which the latch pin is disposed in relation to the socket such that the axis along which the latch pin is slidable is substantially parallel to a tangent to the periphery of the bore of the socket, the latch pin axis being offset radially outwards of this tangent by not less than half of the diameter of the latch pin shaft but by not more than half of the diameter of the latch pin head.

2. An attachment assembly as claimed in claim 1, in which said socket means comprises an internally hollow socket whose transverse cross-section is a close clearance fit around the plug means.

3. An attachment assembly as claimed in claim 1, in which said rod is internally solid.

4. An attachment assembly as claimed in claim 1, in which said rod is internally hollow and tubular.

5. An attachment assembly as claimed in claim 1, in which within the latch means, the spring is disposed to bear against the head of the latch pin.

6. An attachment assembly as claimed in claim 1, in which the spring is a compression spring bearing axially against the end of the head longitudinally opposite the end of the head from which the shaft extends.

7. An attachment assembly as claimed in claim 1, in which the notch in said rod comprises a circumferential groove.

8. An attachment assembly as claimed in claim 7, in which said latch means is such that the head of the latch pin engages with said groove such as positively to retain the rod in the socket.

9. An attachment assembly as claimed in claim 1, in which said first member is a part of a vehicle or an accessory for a vehicle, and said second member is the frame or chassis of the vehicle.

10. A mudguard assembly for use on a road vehicle supported on wheel arrangements that are respectively single-wheel or twin-wheel arrangements, said mudguard assembly comprising a mudguard and an attachment assembly for releasably attaching the mudguard to the frame of a vehicle such as to dispose the mudguard to shroud a selected wheel arrangement, in which said attachment assembly comprises an attachment assembly as claimed in claim 1.

11. A mudguard assembly as claimed in claim 10, in which the mudguard comprises at least one transverse tubular support having an inboard and constituting the plug means of the attachment assembly.

12. A mudguard assembly as claimed in 10, in which the socket means of the attachment assembly is permanently secured to a frame member of the vehicle adjacent said selected wheel arrangement.

13. A mudguard assembly as claimed in claim 12, in which the mudguard has two such transverse tubular supports at spaced-apart locations thereon, and two hollow tubular sockets permanently secured to the frame member at corresponding locations.

14. A mudguard assembly as claimed in claim 10, in which said mudguard has the form of a unitary mudguard adapted to shroud the upper part of the tyre or tyres together with at least the upper part of the outer face of the wheel (in a single-wheel arrangement) or at least the upper part of outer face of the outer wheel (in a twin-wheel arrangement).

15. A mudguard assembly as claimed in claim 14, in which said unitary udguard envelops at least 50% of the tyre on the single wheel, or at least 50% of the tyre on the outer wheel of a twin-wheel arrangement.

16. A mudguard assembly as claimed in claim 15, in which the unitary mudguard envelops 65% to 70% of the tyre on the single wheel, or 65% to 75% of the tyre on the outer wheel of the twin-wheel arrangement.

17. A mudguard assembly as claimed in claim 10, in which the mudguard comprises a skirt attached along at least part of its lower edge.

18. A mudguard assembly as claimed in claim 17, in which the mudguard comprises a skirt attached along its lower edges at the front, rear, and outer side.

19. A mudguard assembly as claimed in claim 17, in which the skirt comprises bristle strips.

20. A mudguard assembly as claimed in claim 10, in which the unitary mudguard is an integral plastics moulding having at least one air scoop incorporated therein and/or at least one rib positioned to direct water between wheel axles.

21. A side-skirt assembly for use on a road vehicle, in which said side skirt assembly comprises a side skirt and an attachment assembly for releasably attaching the side skirt assembly to the frame of the vehicle such as to dispose the side skirt to shroud a selected region under the vehicle, said attachment assembly comprising attachment means as claimed in claim 1.

22. A side-skirt assembly as claimed in claim 21, in which the side skirt comprises at least one tubular support extending from the side skirt to the vehicle frame, the tubular support having an end remote from the side skirt formed to constitute the plug means of the attachment assembly.

23. A side-skirt assembly as claimed in claim 22, in which the socket means of the attachment assembly is permanently secured to a frame member of the vehicle.

24. A side-skirt assembly as claimed in claim 23, in which the side skirt assembly is such that the side skirt has a plurality of such tubular supports at spaced-apart locations thereon, and a like plurality of hollow tubular sockets permanently secured to the frame member at corresponding locations.

25. A side-skirt assembly as claimed in claim 21, in which said side skirt assembly comprises a cover adapted to shroud the upper part of the outer face of the wheels of the vehicle.

26. A side-skirt assembly as claimed in claim 25, in which said cover extends down over at least 50% of the outer face of the tyre on a single wheel, or at least 50% of the tyre on the outer wheel of a twin-wheel arrangement.

27. A side-skirt assembly as claimed in claim 26, in which the cover extends down over 65% to 70% of the outer face of the tyre on the single wheel or over 65% to 70% of the tyre on the outer wheel of a twin-wheel arrangement.

28. A cover assembly comprising a side-skirt assembly as claimed in claim 21, in combination with an under-run barrier assembly comprising an under-run barrier and an attachment assembly for releasably attaching the under-run barrier to the frame of the vehicle such as to dispose the barrier to inhibit access to space under the vehicle.

29. A cover assembly as claimed in claim 28, in which said cover assembly incorporates a cover that extends from the top of a wheel downwards for a distance of at least 50% of the height of the wheel.

30. A cover assembly as claimed in claim 29, in which the cover extends downwards over 65% to 70% of the height of the wheel.

31. An under-run barrier assembly for use on a road vehicle, in which said under-run barrier assembly comprises an under-run barrier and an attachment assembly for releasably attaching the under-run barrier to the frame of the vehicle such as to dispose the barrier to inhibit access to space under the vehicle said attachment assembly comprising an attachment means as claimed in claim 1.

32. A cover assembly as claimed in claim 31, in which said cover comprises at least two panels configured to permit adjustment of the overall size of the cover.

33. A cover assembly as claimed in claim 32, in which the cover comprises at least two overlapping panels configured to undergo telescopic sliding relative to each other so as to vary the overall size of the cover.

34. A cover assembly as claimed in claim 33, in which the cover comprises a first panel having a respective channel formed along each of its top and bottom edges, and a second panel configured to mate with said first panel such as to slide in said channels for telescopic adjustment of the cover size.

35. A cargo-transporting road vehicle, said vehicle incorporating at least one attachment assembly as claimed in claim 1.

36. An attachment assembly as claimed in claim 1, which said first member is a machine guard and said second member is a machine to which the machine guard is selectively attached.

* * * * *